Patented Feb. 4, 1930

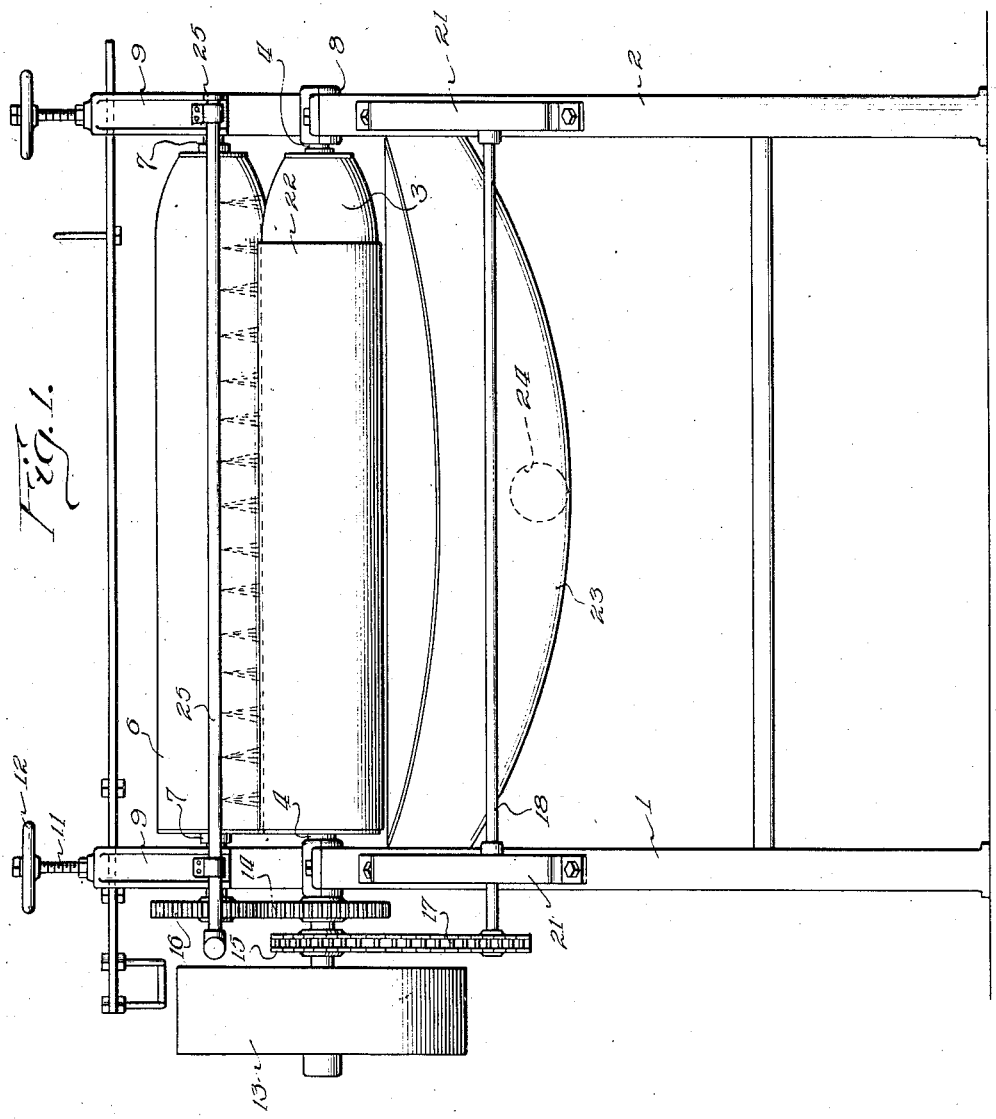

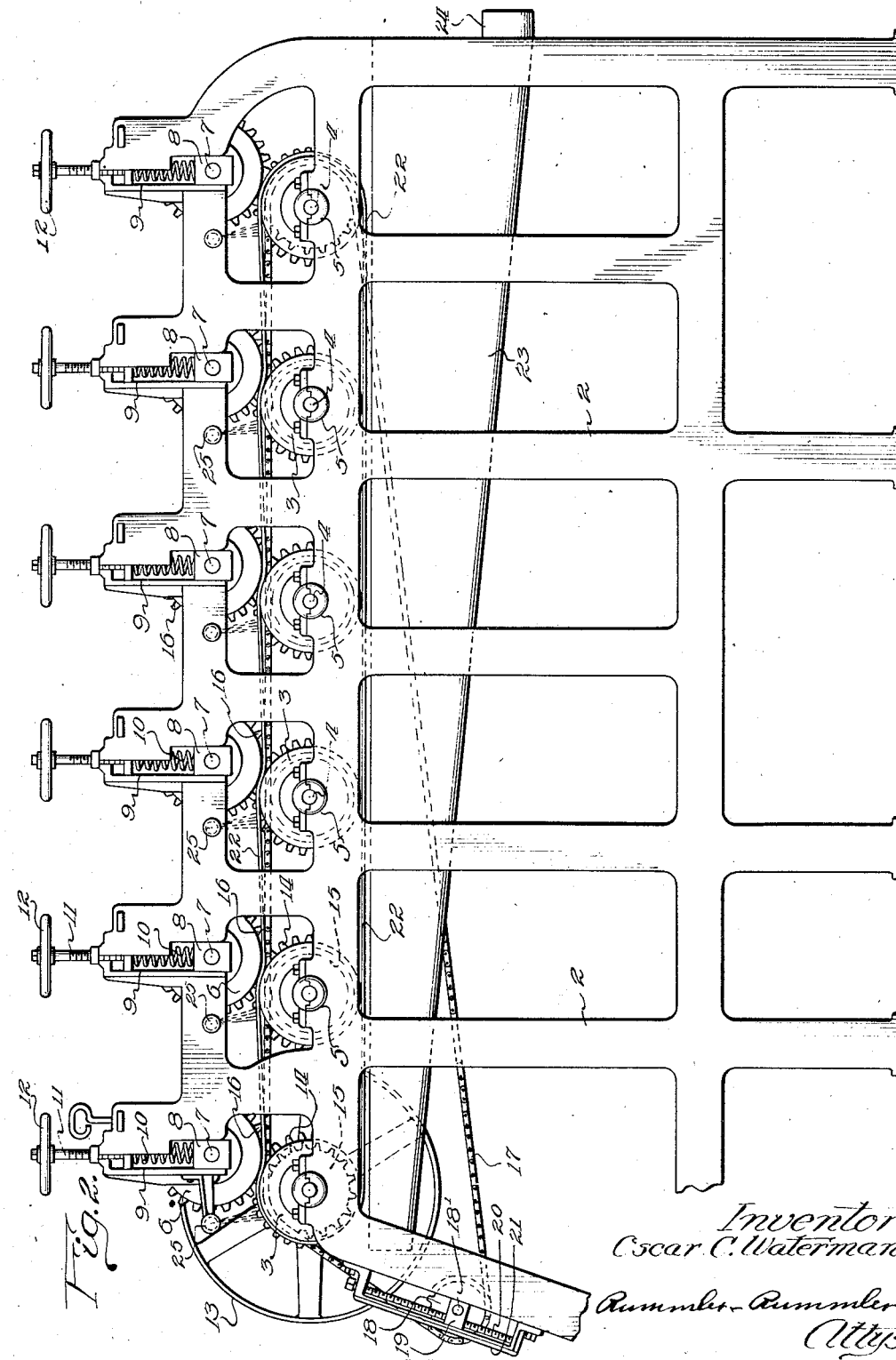

1,745,564

UNITED STATES PATENT OFFICE

OSCAR C. WATERMAN, OF CHICAGO, ILLINOIS, ASSIGNOR TO SWIFT & COMPANY, OF CHICAGO, ILLINOIS, A CORPORATION OF ILLINOIS

CLEANING ANIMAL INTESTINES

Application filed January 24, 1929. Serial No. 334,652.

This invention relates to an improved method and means for cleaning animal intestines and particularly for preparing the same for use as casings.

The main objects of this invention are to provide an improved method and means for cleaning animal intestines for avoiding the necessity of long soaking periods; to provide an improved method for eliminating the offensive odors which usually accompany long soaking operations; to provide an improved method for materially reducing the time, labor, floor space and apparatus required in present processes of cleaning casings, and to provide means for obtaining a larger percentage yield of a high-grade product.

Heretofore, after the casings or intestines of animals had been pulled from set, they were stripped by hand or by passing them between rollers to remove their contents. Then the partially empty casings were allowed to soak in water for from twelve to forty-eight hours to remove animal heat, loosen the slime and outside tissues. A re-stripping operation followed the soaking period in which the loosened slime was removed by rollers, squeegees or by hand.

My improved method in general omits entirely the soaking operation and consists of passing the casings progressively between a series of pairs of pressure rollers immediately after they have been pulled from the set and maintaining the animal temperature throughout the operation by continuously flushing with warm water. Each successive pair of rollers between which the casings are passed are set to apply a greater pressure on the casings than the preceding pair, thus gradually removing substantially the entire contents of the casings in successive steps and breaking down the slime and loosening the undesirable tissue. The rollers may be set for applying the same pressure if desired but it is better to apply successively increased pressures. The casings are retained at a warm temperature corresponding to that of the living animal body and the materials removed from them are washed away during the cleaning operation by spraying water of substantially 95 degrees to 100 degrees F. upon them.

The casings are then, as is now usually the practice, passed once or twice through a cleaning machine to remove all the remaining slime tissue and dirt adhering thereto and they are subsequently graded and cured.

In the accompanying drawings, I have illustrated a specific example of a machine employed in my invention in which:

Fig. 1 is a front elevation.

Fig. 2 is a side elevation.

In the form shown, the machine or roller press for removing the contents of animal intestines comprises spaced side supporting structures 1 and 2 in which six pairs of rollers or compressing units are mounted. The lowermost roller 3 of each pair is mounted on a shaft 4 journaled in stationary bearings 5 on the side frames and the uppermost roller 6 of each pair is mounted on shaft 7 journaled in bearings 8 slidably mounted in guide members 9 on the frame. The uppermost rollers 6 are each urged downwardly against their respective lower rollers 3 by a spring 10 mounted within each guide member 9 and compressed by a turnbolt 11 actuated by a turnwheel 12.

The shaft 4 of the lower front roller 3 is provided with a pulley wheel 13 and each of the lower shafts 4 is provided with a pinion 14 and a sprocket wheel 15. The pinions 14 of each lower shaft 4 mesh with a pinion 16 on each upper shaft 7 thereby causing the upper and lower rollers to rotate in opposite directions.

An endless chain 17 is engaged with some of the teeth of all of the sprocket wheels 15 and passes around the rear sprocket wheel and around an idler sprocket wheel 18 adjustably mounted on the front of the machine. The idler sprocket wheel 18, mounted on a shaft 18', carried by blocks 19 which are threaded on screws 20, and guided by braces 21, may be adjusted for suitably tensioning the chain 17.

A continuous belt 22 extends around the lower rollers 4 of the front and rear pairs of rollers and between the upper and lower rollers of each pair. This belt is provided for receiving the casings and conveying them through between each pair of rollers in succession.

An apron 23 is suspended from the side structures 1 and 2 in a rearwardly and downwardly inclined position below the rollers and the belt thereon for catching the slime and dirt removed from the casings. The end of the apron 23 is provided with an outlet aperture 24 through which the slime and dirt may be conveniently removed from the apron.

A perforated pipe 25 is provided in advance of the compressing rollers and is supplied by conduits, not shown in the drawings, with heated water having a temperature of substantially 95 to 100 degrees. The water is sprayed upon the casings as they are passed between successive pairs of rollers for keeping them moist and at a suitable temperature and for washing the loosened dirt and slime into the apron 23 after each stripping operation is performed by the preceding pair of rollers.

When the machine is in operation, the pulley 13 is driven by a belt connected to any suitable source of power, not shown in the drawings, and all of the rollers are rotated in unison with each other by the endless chain 17. Each pair of rollers may be set by manipulation of the turnscrews 11 for applying a predetermined pressure. Usually the turnscrews 11 of the front and rear rollers are adjusted to apply the minimum and maximum pressures respectively and the turnscrews 11 of the intermediate pairs of rollers are each set so as to apply a pressure greater than the pressure of the next forward pair of rollers and less than the pressure of the next rearward pair of rollers.

The improved method and machine herein described make unnecessary the customary and offensive soaking operation which has heretofore been regarded as essential and unavoidable. By maintaining the animal temperature while subjecting the intestines promptly after being pulled from the set to repetitive squeezing and flushing operations, the slime and adhering tissue are broken down and the major part thereof removed. By saving the time, equipment, and space heretofore devoted to the soaking operation great saving in expense has been accomplished and the finished casings are of better quality because of this treatment.

Although but one specific embodiment of this invention has been herein shown and described, it will be understood that details of the construction shown may be altered or omitted without departing from the spirit of this invention as defined by the following claims.

I claim:

1. The method of cleaning animal intestines which comprises squeezing the natural contents therefrom, immediately after removal from the set, by passing the casings between successive pairs of rollers, while maintaining the intestines at approximate live animal temperature by spraying them with heated water during the squeezing operation.

2. The method of cleaning animal intestines which comprises squeezing the natural contents therefrom, immediately after removal from the set, by passing the casings between successive pairs of rollers, each successive pair applying a greater pressure than the previous pair.

3. The method of cleaning animal intestine which comprises subjecting the intestines to an initial pressure for removing a portion of their natural contents, and subjecting the same to successive pressure operations thereafter for removing the remainder of the natural contents, each successive pressure operation being greater in intensity than the preceding one.

4. The method of cleaning animal intestines which comprises subjecting the intestines to an initial pressure for removing a portion of their natural contents, and subjecting the same to successive pressure operations thereafter for removing the remainder of the natural contents, each successive pressure operation being greater in intensity than the preceding one, and maintaining approximate live animal temperature of the intestines during the pressure operations.

5. The method of cleaning animal intestines which comprises subjecting the intestines to an initial pressure for removing a portion of their natural contents, and subjecting the same to successive pressure operations thereafter for removing the remainder of the natural contents, each successive pressure operation being greater in intensity than the preceding one and continuously washing the intestines with warm water during the pressure operations.

6. The method of cleaning animal intestines which consists in placing the intestines on a continuous belt, passing the belt and the intestines thereon between a series of compressing units, each successive compressing unit applying a greater pressure than the preceding unit, and spraying water on said belt and intestines after the compressing operations of each unit to moisten the same and to wash the loosened slime tissue and dirt therefrom before the next successive compressing operation.

7. The method of cleaning animal intestines which consists in applying pressure thereon in successive steps, each compressing step being of greater intensity than the preceding step, and spraying the intestines with water after each compressive step to wash away the dirt and slime therefrom.

Signed at Chicago this 21st day of January, 1929.

OSCAR C. WATERMAN.